(12) United States Patent
Harris

(10) Patent No.: US 8,212,740 B1
(45) Date of Patent: Jul. 3, 2012

(54) AUTOMATIC CONFIGURATION OF MULTIPLE MONITOR SYSTEMS

(76) Inventor: Scott C. Harris, Rancho Santa Fe, CA (US)

( * ) Notice: Subject to any disclaimer, the term of this patent is extended or adjusted under 35 U.S.C. 154(b) by 1108 days.

(21) Appl. No.: 11/775,868

(22) Filed: Jul. 11, 2007

Related U.S. Application Data

(63) Continuation of application No. 09/569,816, filed on May 12, 2000.

(51) Int. Cl.
*G09G 5/00* (2006.01)
*G06F 3/048* (2006.01)
(52) U.S. Cl. ............ 345/1.1; 715/781; 715/843
(58) Field of Classification Search ............ 345/1.1; 715/781, 843
See application file for complete search history.

(56) References Cited

U.S. PATENT DOCUMENTS

| | | | |
|---|---|---|---|
| 4,566,004 A | 1/1986 | Emerson | |
| 4,933,885 A | 6/1990 | Kato et al. | |
| 5,179,648 A | 1/1993 | Hauck | |
| 5,283,856 A | 2/1994 | Gross et al. | |
| 5,307,055 A | 4/1994 | Baskin et al. | |
| 5,315,697 A | 5/1994 | Nagamatsu | |
| 5,481,735 A * | 1/1996 | Mortensen et al. | 709/246 |
| 5,682,486 A | 10/1997 | Grossman et al. | |
| 5,682,529 A | 10/1997 | Hendry et al. | |
| 5,694,121 A | 12/1997 | Krause et al. | |
| 5,727,155 A | 3/1998 | Dawson | |
| 5,745,109 A | 4/1998 | Nakano et al. | |
| 5,757,371 A * | 5/1998 | Oran et al. | 715/779 |
| 5,760,776 A * | 6/1998 | McGurrin et al. | 715/841 |
| 5,796,397 A * | 8/1998 | Kusano | 715/804 |
| 5,889,517 A * | 3/1999 | Ueda et al. | 715/803 |
| 5,923,307 A | 7/1999 | Hogle, IV | |
| 5,927,307 A | 7/1999 | King | |
| 5,995,085 A | 11/1999 | Bowen | |
| 5,999,177 A | 12/1999 | Martinez | |
| 6,002,395 A | 12/1999 | Wagner et al. | |
| 6,006,225 A * | 12/1999 | Bowman et al. | 1/1 |
| 6,043,817 A | 3/2000 | Bolnick et al. | |
| 6,104,359 A * | 8/2000 | Endres et al. | 345/589 |
| 6,144,358 A | 11/2000 | Narayanaswamy et al. | |
| 6,191,758 B1 | 2/2001 | Lee | |
| 6,297,817 B1 | 10/2001 | Larson et al. | |
| 6,310,655 B1 | 10/2001 | Godwin | |
| 6,327,482 B1 | 12/2001 | Miyashita | |
| 6,331,840 B1 | 12/2001 | Nielson et al. | |
| 6,338,004 B1 | 1/2002 | Usui | |

(Continued)

FOREIGN PATENT DOCUMENTS

JP 0822436 A 1/1996

OTHER PUBLICATIONS wikipedia.org, VMU.

(Continued)

*Primary Examiner* — Jeffrey Chow
(74) *Attorney, Agent, or Firm* — Law Office of Scott C. Harris, Inc.

(57) ABSTRACT

Control of multiple display screens associated with a computer, wherein the auxiliary screen display content that depends on conditions of the computer. During some times the auxiliary screen displays content associated with the presently executing program, and during other times the auxiliary screen displays history information. The rules can be automatically changed or manually changed.

20 Claims, 5 Drawing Sheets

U.S. PATENT DOCUMENTS

| | | | | |
|---|---|---|---|---|
| 6,456,304 B1 * | 9/2002 | Angiulo et al. | | 715/779 |
| 6,522,309 B1 | 2/2003 | Weber | | |
| 6,587,082 B1 | 7/2003 | Moore | | |
| 6,728,680 B1 * | 4/2004 | Aaron et al. | | 704/271 |
| 6,859,219 B1 | 2/2005 | Sall | | |
| 7,007,240 B1 * | 2/2006 | Anderson et al. | | 715/790 |
| 7,030,837 B1 | 4/2006 | Vong et al. | | |
| 7,032,172 B1 * | 4/2006 | Lee et al. | | 715/203 |
| 2005/0149879 A1 | 7/2005 | Jobs et al. | | |

OTHER PUBLICATIONS

Harris, "Unofficial Dreamcast FAQ", Feb. 2000.
Levine "The Complete Reference: Windows 98" 1998.
Wilkipedia.org, "Resident Evil 2".
Wikipedia.org "Taskbar".
Dreamcast, "screen shot of Biohazard 2 value plus game" game, Capcom, 1999.
Dreamcast "Resident Evil 2" manual, Capcom 2000.
Visual memory Unit Instruction Manual, Sega 1999.

* cited by examiner

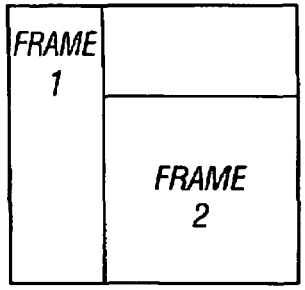
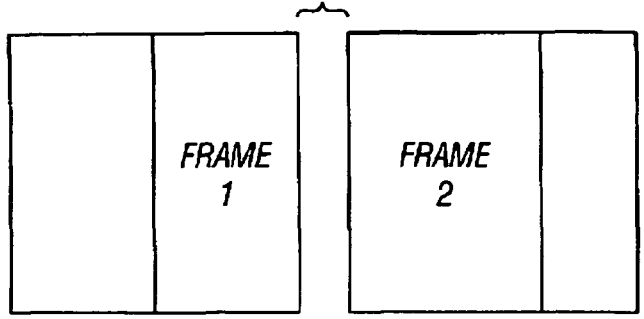
*FIG. 6A*      *FIG. 6B*
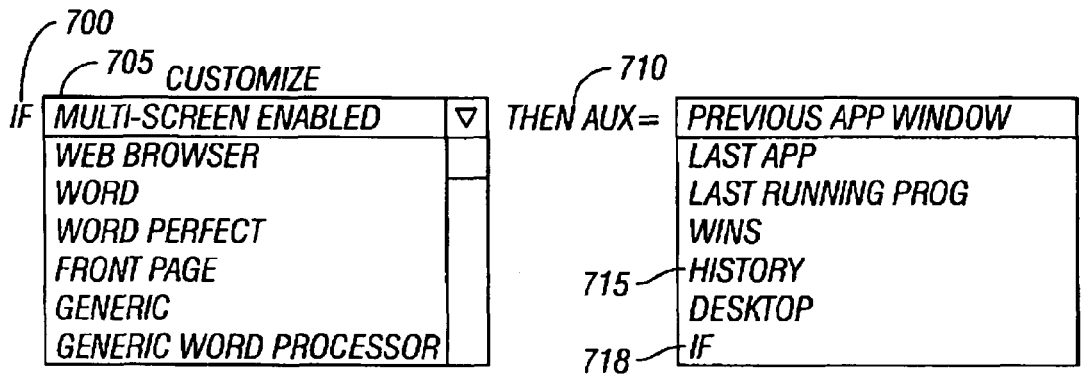
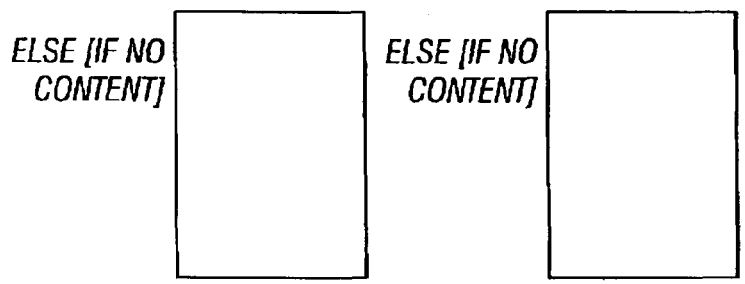
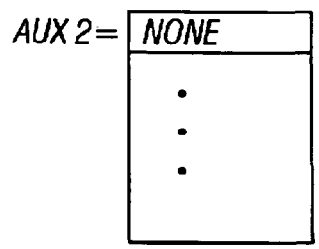
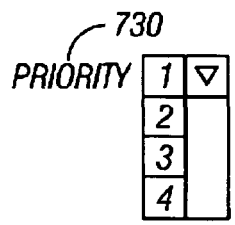
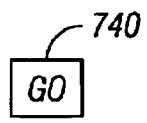
*FIG. 7*

AUTOMATIC CONFIGURATION OF MULTIPLE MONITOR SYSTEMS

CROSS REFERENCE TO RELATED APPLICATIONS

This application is a continuation of U.S. application Ser. No. 09/569,816, filed May 12, 2000.

BACKGROUND

Modern operating systems may allow operation with multiple display screens. Windows 98, for example, allows two different display cards to be used in the system, each display card running an associated display.

SUMMARY

The present application defines automatic arranging of the content on multiple display screens. The arranging is "intelligent" in the sense that the arrangement on the screens depends on environment and/or history in a way to provide meaningful content to the user. The content is variable depending on conditions. In an embodiment, the system learns preferences from previous operations. For example, rules can be applied based on a user's previous settings for a condition.

A specified condition can include its own set of rules.

BRIEF DESCRIPTION OF THE DRAWINGS

These and other aspects will now be described in detail with respect to the accompanying drawings, wherein:

FIGS. 6A-6B shows a flowchart of preference;

FIG. 7 shows customization features;

DETAILED DESCRIPTION

Figure 1A:
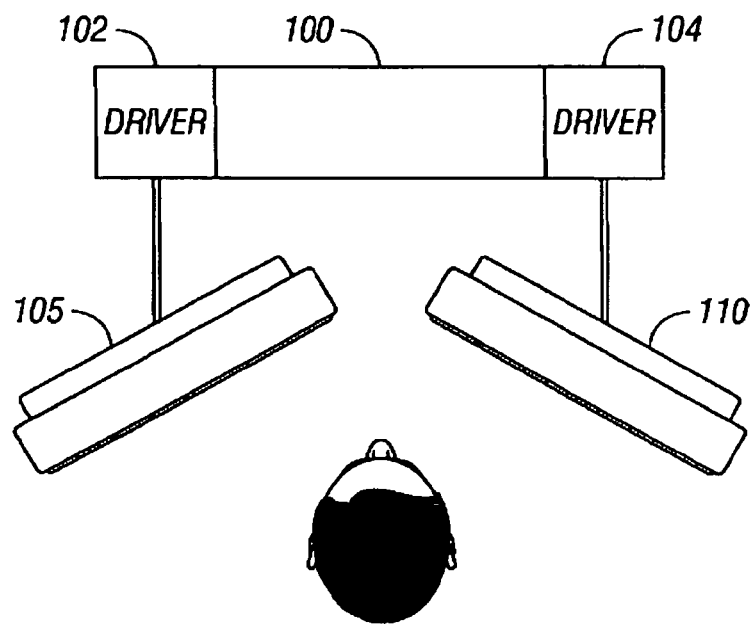
FIG. 1A shows a view of hardware in which a single computer includes two separate display screens.
Figure 1B:
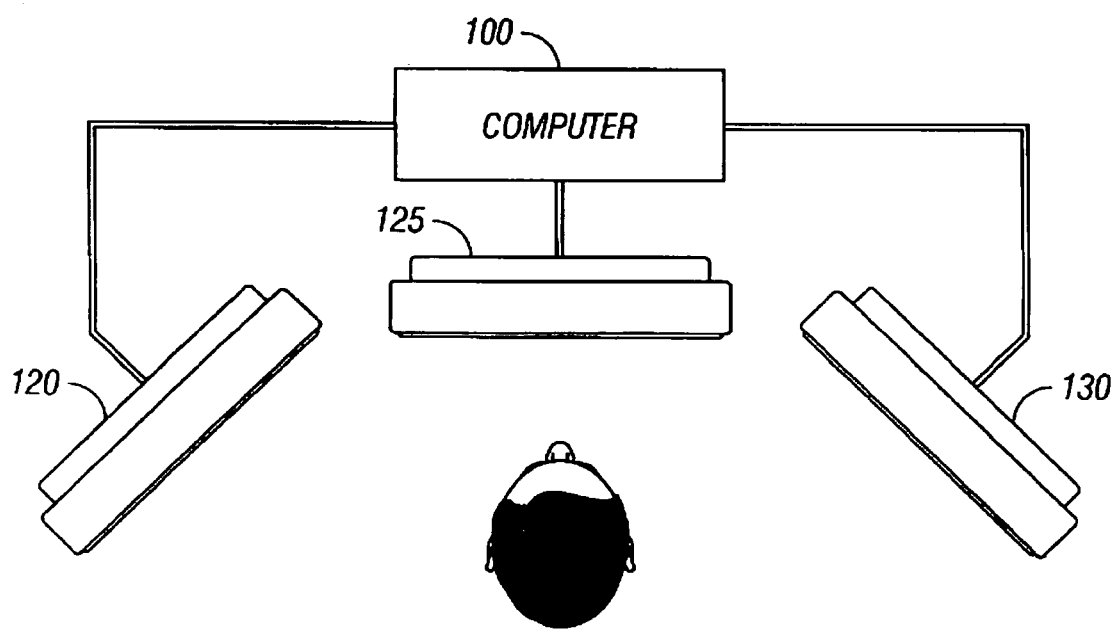
FIG. 1B shows a view of a computer with three display screens.

FIGS. 1A and 1B show computer systems with multiple display screens. FIG. 1A has two separate computer screens 105, 110. The computer 100 can be a single-processor computer with two different display drivers 102, 104, driving the two different display screens 105, 110. The two display drivers can be part of the computer, or can be separate display cards. Alternately, the two display drivers can be on a single display card. Each display driver drives the separate display screen.

The computer can also be a multiple processor computer. The operating system can assign threads to the two processors such that each one processor handles the display for a different one of the screens. This is most advantageously accomplished by including the display drivers on the motherboard itself. However, it can also be accomplished on the PCI bus, e.g. by using PCI bridges in which the PCI bus is periodically controlled by alternate processors. The operating system controls the two display devices according to the description given herein.

FIG. 1B shows an alternative layout, in which three screens 120, 125, 130 are driven by the computer 100. The screens are arranged with one screen flat in front of the user, and two others at angles to the user.

Figure 2:
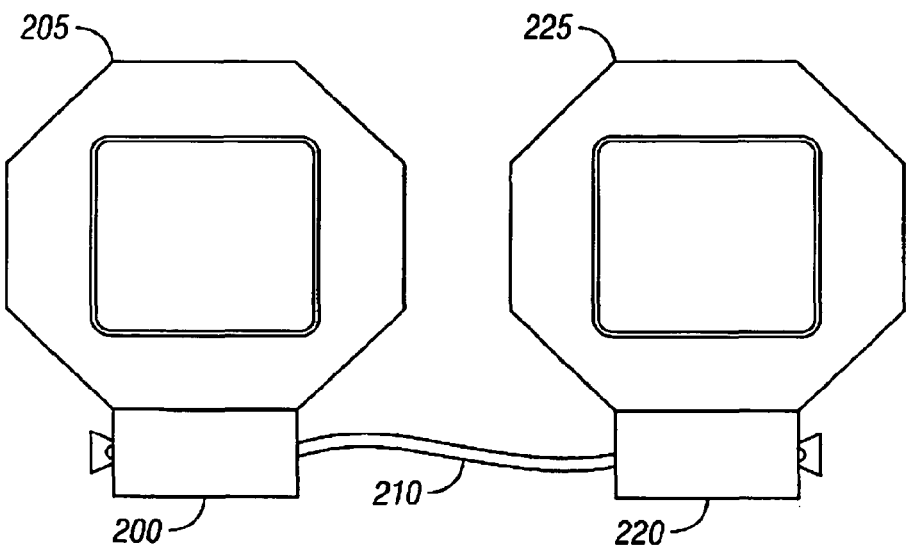
FIG. 2 shows a configuration in which a remote connection is used to form a multiple screen display system.

An alternative computer system with multiple display screens is shown in FIG. 2. In this system, the computer 200 with display 205 is connected over remote connection 210 to second computer 220 with its own display screen 225. The remote connection can be for example by Ethernet, by a fast Internet connection, or the like. The remote connection can also be a docking station, e.g. when one of the computers is a laptop and the other is a docking computer. The remote connection can also be by Bluetooth, Firewire USB or any other bi-directional communication system. The information to be displayed on the second computer is sent over the remote connection to the second computer. One additional advantage of this system is that the second computer can also have a sound card and all other peripherals. This enables even more information to be output, e.g. sound from two applications.

The present application is disclosed in the context of a Windows™ type operating system in which multiple windows of information can be open at once. Other operating systems can alternatively be used. The operating system controls the screens as described herein.

Figure 3:
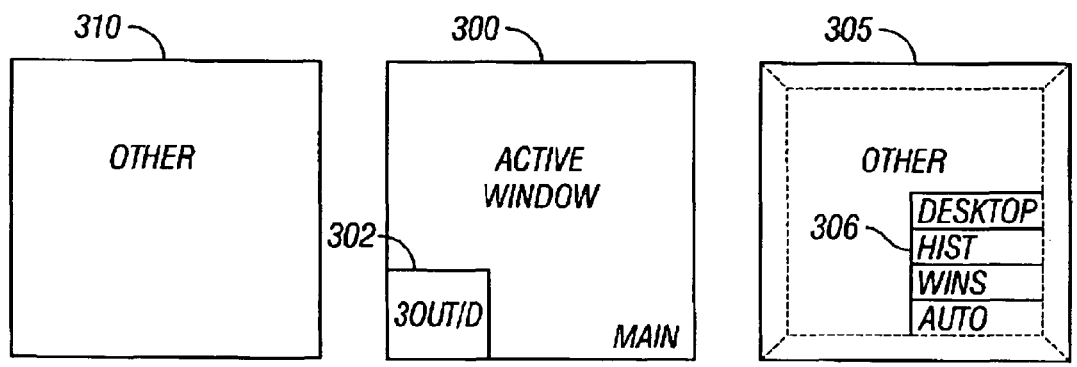
FIG. 3 shows multiple items of screen information.

FIG. 3 shows the screen information to be displayed on the screens. The control of the display is carried out by the operating system. A main screen 300 is shown in the middle with the auxiliary screen 305 shown on the right. A third screen 310 is shown on the left. This would advantageously place the main screen in the middle, with the auxiliary screens surrounding the main screen. A two screen environment, however, is contemplated.

The contents of the main screen is defined as usual—as the main or focus screen. The alternative screens 305 and 310 change content based on conditions. The conditions can include the software that is running and/or the software that has run in the past.

Screen 305 shows a content control menu 306. The AUTO setting is the default setting for the screen, but other options can be selected. The content control part can be caused to automatically hide when it is not being used. Placing the cursor over that spot thereafter causes the content control to reappear.

The "auto" setting operates according to a flowchart of preferences indicating the content that the alternative screens will display based on the computer's condition and a previous operation, the "history". The user can also select to override the automatic operation as disclosed herein. These preferences effectively form "rules".

Manual operations are also available.

Figure 4A:
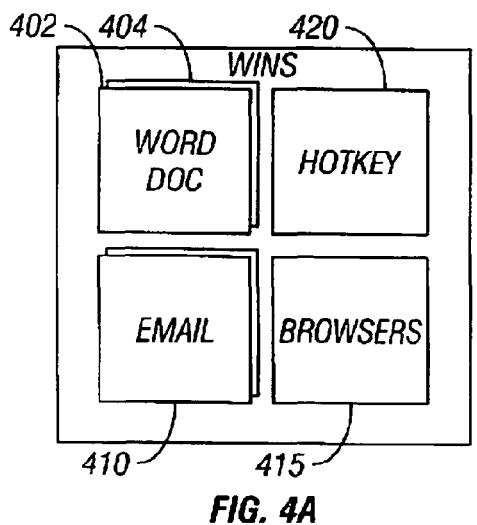
FIGS. 4A-4B shows multiple items of screen information.

The WINS option causes the auxiliary screen to display reduced versions of all inactive windows as shown in FIG. 4A. FIG. 4A shows all of the currently active windows, including for example Word™ 402 showing a Word document. The most currently-obtained Word document is shown in front, with other Word documents 404 behind it.

Therefore, the current focus screen is shown in the main screen 300, while the auxiliary screen 305 shows the FIG. 4A view. FIG. 4A also shows the e-mail program 410, a web browser 415 and a hotkey area 420. The hotkey 420 can be a location which enables selection of specified programs which are assigned to the hotkey.

Figure 4B:
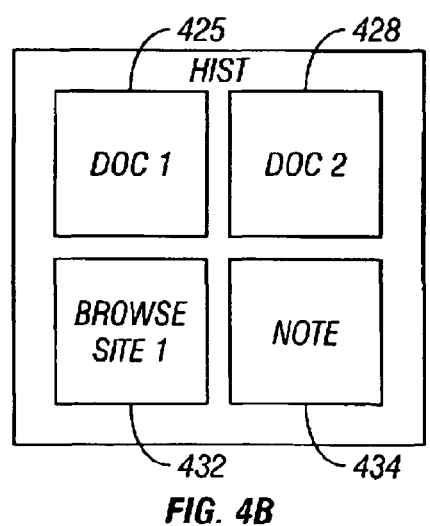

The HISTORY configuration is shown in FIG. 4B. The HISTORY alternative brings back a historical list of items, e.g. "documents" which were previously opened. While FIG. 4B shows only four such documents, it should be understood that miniaturized versions of many more documents could be provided. FIG. 4B shows the first item 425 being the last document that was opened. Prior to that, the user was editing a second document "doc 2" which is shown as 428. The browser 432 is shown browsing site no. 1, and 434 represents a notepad document for example.

Another alternative which can be selected is the desktop, in which the user always sees their DESKTOP in auxiliary screen 305. Other alternatives, not specifically disclosed herein, are also possible.

When the auto selection is selected, the operating system automatically selects which of the multiple modes will appear on the auxiliary screen. This automatic mode configures the auxiliary screen 305 to automatically provide content which is most likely to be the content that is most useful to the user under the conditions. The content can also be based on choices made by the user during a previous operation.

Figure 5:
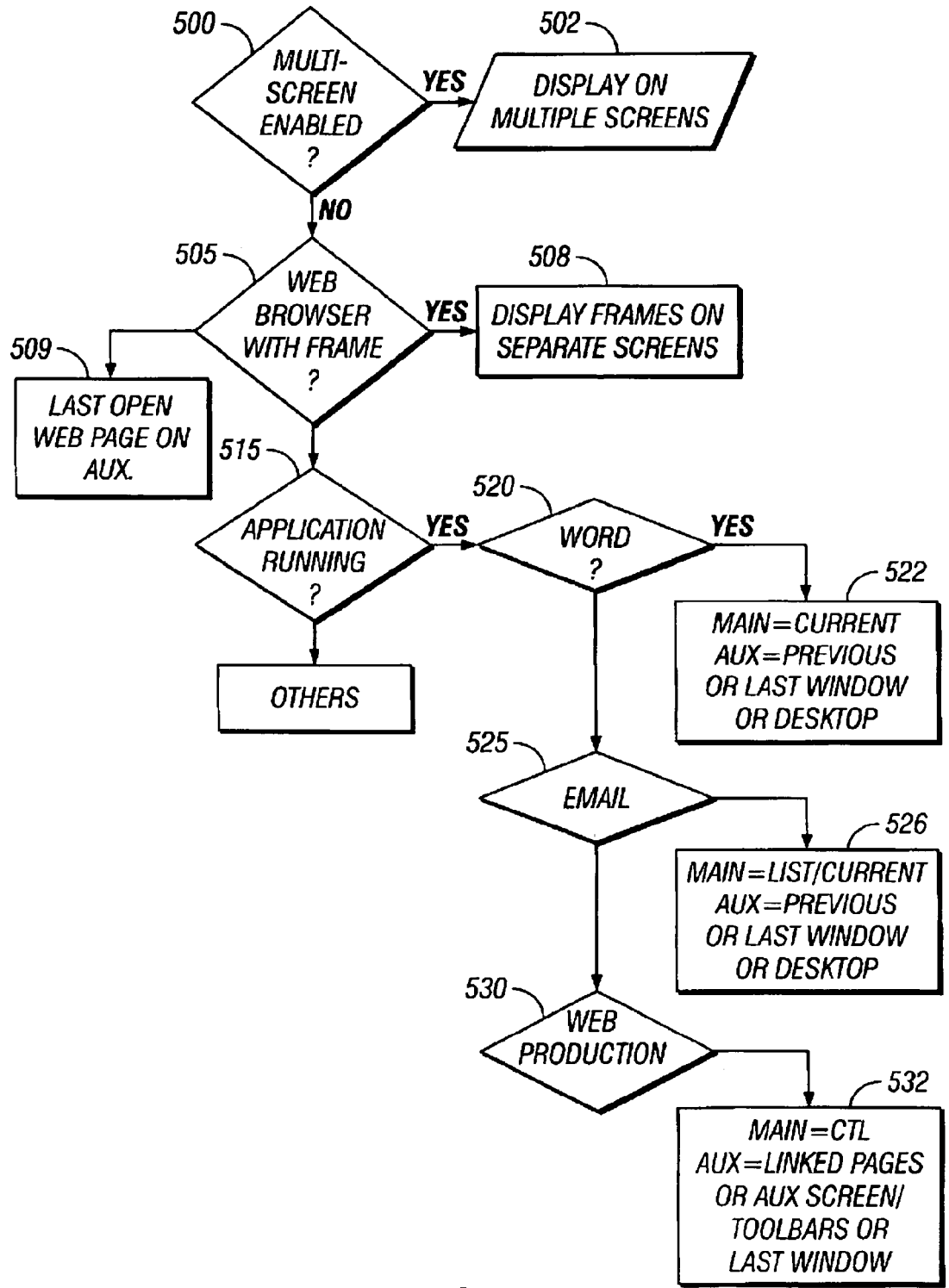
FIG. 5 show a flowchart of preferences.

The operation progresses as shown in FIG. 5. This occurs according to a flowchart of preferences in which the system first determines various things about the operation and configures the screens accordingly.

At 500, the system first determines if the application is a type which can be displayed on multiple screens without adaptation, e.g. a multi-screen enabled game or application is displayed on the screens as described herein. If so, the content is displayed on the multiple screens at 502.

If 500 is negative, the operation moves to 505 which detects a web browser operation. If a browser is active at 505, the system first determines if the browser is reading a page which has multi screen-capable-frames. Multi-screen frames allow display in either one screen or multiple screens. FIG. 6A shows all of the frames are displayed on a single screen. FIG. 6B shows the same content when operating in a multi-screen paradigm at 508. Each frame can be displayed on a separate screen.

If the web browser detects that the current system is not a special multi-screen enabled frame, then the current page is simply displayed on the main screen 300, and the auxiliary screen 305 is then configured to receive the last web page that was opened at 509. In this way, the system displays the current page, and the last page. When the system is operating in this latter mode, it becomes possible to flip screens. Therefore, a special hotkey 392 is displayed on the main screen in an "always on top" mode. If this portion is actuated by a click, then the main and previous screens are switched. At 515, no browser has been detected, so the system determines if an application is running. Different applications are defined, for example in the windows registry. The present application discusses two such applications, a word processing program such as Microsoft Word, an e-mail program and a web page production program such as "Front Page". These different options are shown in steps 520, 525 and 530 respectively.

In the word processing program, the main screen displays the currently active document, while the auxiliary screen display previously opened documents at 522. The previous documents may be displayed in miniature form (like FIGS. 4A-4B), or may be displayed in full size. If no last document is available, that is if the word processing program is working on only one document, then the screen represents the last window. If no last window is available, then the screen shows the desktop.

Analogously, in an e-mail program at 525, the main screen showing the list of available e-mail or current open e-mails is first displayed. At this time, the auxiliary screen display, in order of preference, the last e-mail screen worked on, if not, the last window displayed, and if not the desktop at 525.

The development program, here a web page development program at 530, displays the main control and the main screen on the main screen 300 at 532. The auxiliary screen shows other web pages which are linked to the main web page. If no such pages have yet been formed, the auxiliary screens can show other hidden toolbars and help screens.

In this way, the user need not configure the multiple screens. Rather they are automatically configured for the user based on data about what the user might want.

While this system provides preferences, it should be understood that the user may have their own preference that differs from the presets. The system provides a customization feature. However, it is understood that real customization features are usually only fully utilized by so called power users. Therefore this system provides both a direct customization feature, and also a context-imitating customization feature. The real customization feature is shown in FIG. 7. In this Figure, the user can select and write "rules" for customizing the screen usage. For example, as shown, the "If" content at 700 has a pull down menu at 705 listing the different applications in the registry. The applications may include web browser, e-mail programs, word processing programs, and generic settings. More specific settings for different specific programs can include Word™, Outlook™ and the like. For each of these programs, the user can select various options from the "then" in 710. The current selection (e.g. the usual default) is shown in the pop-up list at 715. The default can be from any of the options discussed above or any other possible option. The "else" options specify what to do if the specified content is not available.

In addition, the rule-based interface enables different operations at different times. For example, as shown, the user can specify an additional "If" 718. For example, if more than four documents are open, then use the alternative screen in a different way than it would be used if 3 or fewer documents are open. A priority 730 is also set, to determine how to handle multiple rules. The priority sets the order of execution of the rules.

Figure 8:
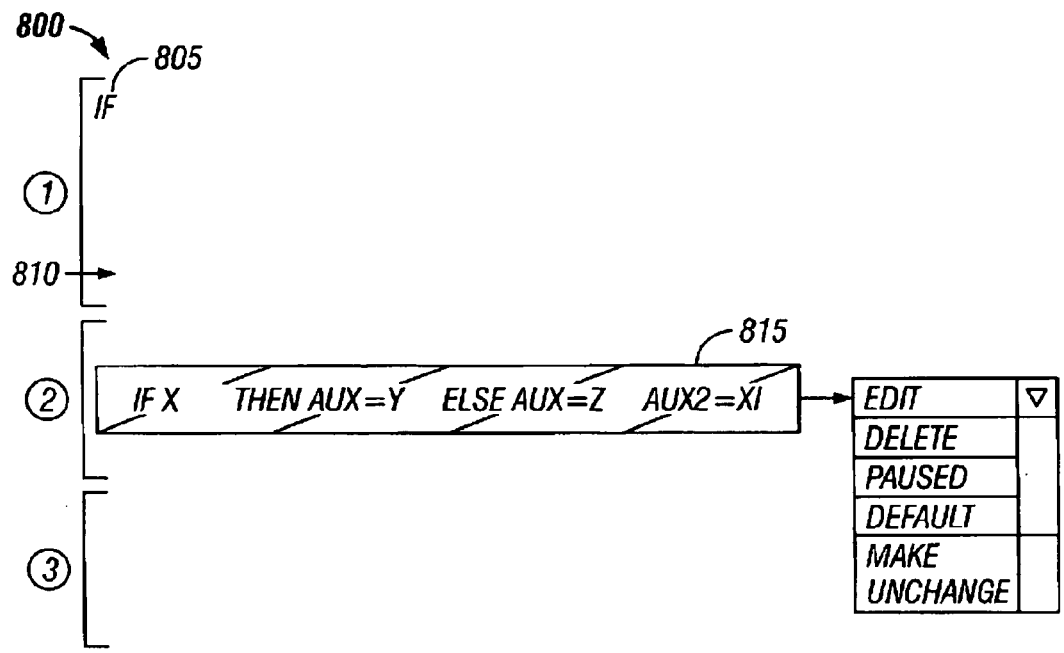
FIG. 8 shows the rules.

Each of these preferences is then compiled into a plurality of text-based rules shown in FIG. 8. The rules are of the general form if X, and Y, or Z (conditions), then alternative screen=option (results). These text based rules may be used directly as the rules for determining what to display on the extra screen, or alternatively they can be compiled into some machine readable form.

The rules are assembled based on their priority. Each time a rule is completed, the go button 740 is executed. This rule is then added to the end of the list for that priority assigned to that rule. For example, FIG. 8 shows the priority 1 rules 800 including rules 805 and like. If a new priority 1 rule is executed, that priority 1 rule is added to the end of the existing priority 1 rules at the location 810. Similarly, there is a location for priority 2 rules, priority 3 rules and the like. Any of the rules can be selected as shown in FIG. 8, selecting the rules 815. Once the rule 815 is selected, a menu is displayed including the ability to edit the rule or other operations which can occur on the rule. Editing the rule brings up the screen of FIG. 7, enabling the rule to be edited to change its priority, its actions, or any other part of the rule. The rule can also be deleted, paused or any other option. Another useful option is DEFAULT which sets this rule as the default rule for the "If" condition associated with that rule, and MAKE UNCHANGEABLE which prevents context automatic formation from changing the rule in the future.

The rules are shown above as editable using pull down boxes of alternatives. However, the rules can alternatively be plain text type rules, e.g., using Visual Basic or other comparable programming language. The rules can also be written as part of a registry file, e.g., the WINDOWS™ registry. Any form of rule which has conditions and results can be used.

Figure 9:
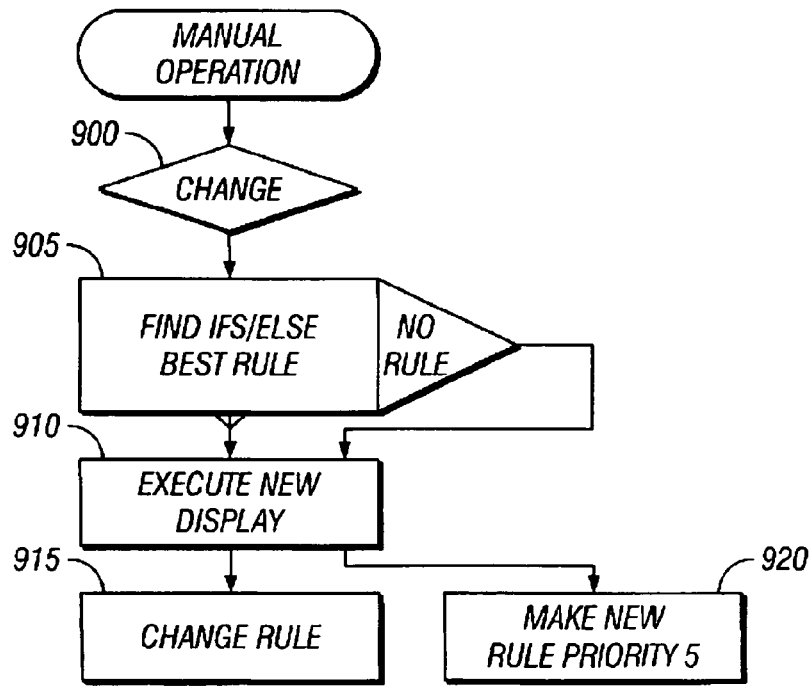
FIG. 9 shows a flowchart of manual operation.

In addition to the manual editing of the rules, the rules can be automatically formed and/or changed by context type automatic formation. Each time a window is displayed, the user has the capability to override the current contents of that window. This can be done using the menu 306, for example. The flowchart effecting that manual operation is shown in FIG. 9.

A change is detected at 900. Once the change is detected, the conditions of the change are detected at 905. That is, a currently running application is detected and all Ifs associated with that currently running application are pulled up. A determination is then made about whether the current condition represents the currently active condition associated with "Then", or one of auxiliary "Elses". At step 910, the system executes the new display condition. This is done by accepting the operation executed in the menu. At step 915 the rule is changed to indicate the new preferences. Of course, this possibility can be overridden. If no rule is found at 905, then a new rule of priority 5 is formed at 920.

Other modifications are contemplated. For example, other forms could be used to express the rules and the preferences. While this system is disclosed for use in editing rules for display, it should be understood that the selectable form of if-then-else that is described for setting preferences could be used for other preference setting operations, such as in the Windows registry or other comparable preference setting parts. All such modifications are intended to be encompassed within the following claims.

What is claimed is:

1. A method of displaying data on multiple screens within a computer, comprising:
   displaying a first menu and second menu of rules,
      wherein said first menu comprises a list of a plurality of conditions, wherein said conditions are a plurality of programs that can occur in the computer,
      wherein said second menu comprises a list of a plurality of preferences, wherein said preferences are a plurality of display modes, wherein said plurality of display modes include a first display mode and a second display mode;
   defining said rules by selecting a preference from said plurality of said preferences for conditions from said plurality of conditions;
   executing at least some of said rules when a program from said plurality of said programs has a current focus;
   displaying a current focus program on a main screen;
   if said current focus program is set for a first display mode of said plurality of display modes, displaying on an auxiliary screen first information associated with said current focus program; and
   if said current focus program is set for a second display mode of said plurality of display modes, displaying on said auxiliary screen second information associated with non-current focus programs.

2. A method as in claim 1, wherein said first information on said auxiliary screen includes reduced versions of all open windows in the operating system that are not the current focus for a first of said rules.

3. A method as in claim 2, wherein said reduced versions include histories representing documents which were previously opened for a second of said rules.

4. A method as in claim 3, wherein said documents are editable documents which were previously being edited.

5. A method as in claim 2, wherein said rules are established and/or edited using pulldown menus.

6. A method as in claim 1, further comprising enabling selection of one of previously opened items on the auxiliary screen.

7. A method as in claim 1, wherein said plurality of previously opened items are displayed in a two-dimensional array.

8. A method as in claim 1, wherein said rules include a menu, which enables selecting multiple different conditions which can occur in the computer, each of said multiple conditions having multiple possible options that are displayed as part of the menu, and can be selected to specify said preferences, based on said preferences selecting the information that will be displayed as said first information on said auxiliary screen.

9. A method of displaying data on multiple screens within a computer, comprising:
   displaying a first menu and second menu of rules,
      wherein said first menu comprises a list of a plurality of conditions, wherein said conditions are a plurality of programs that can occur in the computer, and
      wherein said second menu comprises a list of a plurality of preferences, wherein said preferences are a plurality of display modes, wherein said plurality of display modes include a first display mode and a second display mode;
   defining said rules by selecting a preference from said plurality of said preferences for conditions from said plurality of conditions;
   executing at least some of said rules when a program from said plurality of said programs has a current focus;
   displaying a current focus program on a main screen;
   if said current focus program is set for a first display mode of said plurality of display modes, displaying on an auxiliary screen miniature versions of previously-opened windows associated with said current focus program; and
   if said current focus program is set for a second display mode of said plurality of display modes, displaying on said auxiliary screen miniature versions of non-current focus programs.

10. A method as in claim 9, wherein said defining forms rules that are configured as if, then rules, with the if part of the rule defining the condition, and the then part defining what happens when the condition occurs.

11. A method as in claim 10, further comprising allowing setting a priority of at least one of the rules compared to other rules, said priority defining which rule will be used if the rules contents conflict.

12. A method as in claim 10, wherein said rules also include an else part, which is executed if the then part of the rule does not occur.

13. A method as in claim 10, wherein said rules allow displaying a plurality of previously opened items on said auxiliary screen, with each of said previously opened items being in miniature form so that multiple miniaturized versions, each showing a single previously-opened item, are displayed on said auxiliary screen.

14. A method as in claim 13, wherein said rules allow selecting the kinds of the items, and the selections include at least reduced versions of all open windows in the operating system that are not the current focus, and histories representing documents which were previously opened.

15. A computer apparatus, comprising:
a display creating part enabling display of information on both a main screen and an auxiliary screen of a computer system;
a preference obtaining part, obtain preferences which specify which content is provided on said auxiliary screen, said preference obtaining part
displaying a first menu and second menu of rules,
  wherein said first menu comprises a list of a plurality of conditions, wherein said conditions are a plurality of programs that can occur in the computer, and
  wherein said second menu comprises a list of a plurality of preferences, wherein said preferences are a plurality of display modes, wherein said plurality of display modes include a first display mode and a second display mode;
said preference obtaining device defining said rules by selecting a preference from said plurality of said preferences for conditions from said plurality of conditions;
said computer apparatus operating for executing at least some of said rules when a program from said plurality of said programs has a current focus;
said computer apparatus operating for displaying a current focus program on a main screen;
if said computer apparatus detects that said current focus program is set for a first display mode of said plurality of display modes, said computer apparatus displaying on said auxiliary screen first information associated with said current focus program; and
if said computer apparatus detects that said current focus program is set for a second display mode of said plurality of display modes, displaying on said auxiliary screen second information associated with non-current focus programs.

16. An apparatus as in claim 15, wherein said menu forms rules that are configured as if, then rules, with the if part of the rule defining the condition, and the then part defining what happens when the condition occurs.

17. An apparatus as in claim 16, wherein said preference obtaining part further comprises allowing setting a priority of at least one of the rules compared to other rules, said priority defining which rule will be used if the rules contents conflict.

18. An apparatus as in claim 16, wherein said rules also include an else part, which is executed if the then part of the rule does not occur.

19. An apparatus as in claim 16, wherein said rules command displaying a plurality of previously opened items on said auxiliary screen, with each of said previously opened items being in miniature form so that multiple miniaturized versions, each showing a single previously-opened item, are displayed on said auxiliary screen.

20. An apparatus as in claim 19, wherein said rules allow selecting the kinds of the items, and the selections include at least reduced versions of all open windows in the operating system that are not the current focus, and histories representing documents which were previously opened.

* * * * *